United States Patent
Abe et al.

(10) Patent No.: US 9,047,697 B2
(45) Date of Patent: Jun. 2, 2015

(54) RECORDING MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Goro Abe, Kyoto (JP); Takehiko Hosokawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 210 days.

(21) Appl. No.: 13/734,401

(22) Filed: Jan. 4, 2013

(65) Prior Publication Data

US 2013/0314399 A1    Nov. 28, 2013

(30) Foreign Application Priority Data

May 28, 2012  (JP) .................................. 2012-121077

(51) Int. Cl.
*G06T 15/00* (2011.01)
*G06F 3/0346* (2013.01)
*A63F 13/20* (2014.01)
*A63F 13/428* (2014.01)

(52) U.S. Cl.
CPC ............ *G06T 15/005* (2013.01); *G06F 3/0346* (2013.01); *A63F 13/06* (2013.01); *A63F 2300/1006* (2013.01); *A63F 2300/105* (2013.01); *A63F 2300/6045* (2013.01); *A63F 13/428* (2014.09)

(58) Field of Classification Search
None
See application file for complete search history.

(56) References Cited

U.S. PATENT DOCUMENTS

| | | | | | |
|---|---|---|---|---|---|
| 4,839,838 | A | * | 6/1989 | LaBiche et al. | 708/141 |
| 5,181,181 | A | * | 1/1993 | Glynn | 702/141 |
| 5,905,487 | A | * | 5/1999 | Kwon | 345/158 |
| 5,973,727 | A | * | 10/1999 | McGrew et al. | 348/41 |
| 5,999,185 | A | * | 12/1999 | Kato et al. | 345/420 |
| 6,041,651 | A | * | 3/2000 | Naruo et al. | 73/491 |
| 6,072,467 | A | * | 6/2000 | Walker | 345/157 |
| 6,471,586 | B1 | * | 10/2002 | Aiki et al. | 463/6 |
| 6,520,858 | B2 | * | 2/2003 | Matsui et al. | 463/43 |
| 6,545,661 | B1 | * | 4/2003 | Goschy et al. | 345/158 |
| 7,536,655 | B2 | * | 5/2009 | Abe et al. | 715/848 |
| 7,683,883 | B2 | * | 3/2010 | Touma et al. | 345/163 |
| 7,716,008 | B2 | * | 5/2010 | Ohta | 702/152 |
| 7,938,725 | B2 | * | 5/2011 | Okamura | 463/37 |
| 2007/0015558 | A1 | * | 1/2007 | Zalewski et al. | 463/1 |
| 2007/0021208 | A1 | * | 1/2007 | Mao et al. | 463/36 |

FOREIGN PATENT DOCUMENTS

JP        2006-068027        3/2006

* cited by examiner

*Primary Examiner* — Said Broome
(74) *Attorney, Agent, or Firm* — Nixon & Vanderhye, P.C.

(57) ABSTRACT

An example information processing apparatus includes: an operation part; an attitude output part outputting, in time series, attitude data corresponding to attitude; an information storage part storing, in time series, information relevant to the attitude data outputted by said attitude output part; a display processing part, in correspondence to the attitude data outputted by said attitude output part, performing processing concerning display of a three-dimensional virtual space; an information acquiring part, from the information stored in time series by said information storage part, acquiring information corresponding to the time preceding by a given period the time that operation was performed on said operation part; and an information processing part, on the basis of the operation performed on said operation part and the information acquired by said information acquiring part, performing information processing.

16 Claims, 8 Drawing Sheets

RECORDING MEDIUM, INFORMATION PROCESSING APPARATUS, INFORMATION PROCESSING SYSTEM, AND INFORMATION PROCESSING METHOD

CROSS-REFERENCE TO RELATED APPLICATIONS

This application is based upon and claims the benefit of priority of the prior Japanese Patent Application No. 2012-121077, filed on May 28, 2012, the entire contents of which are incorporated herein by reference.

FIELD

The technology herein relates to a recording medium, an information processing apparatus, an information processing system, and an information processing method for detecting the attitude of an apparatus and then performing various kinds of information processing corresponding to the attitude.

BACKGROUND AND SUMMARY

In the conventional art, in some portable information processing apparatuses such as a handheld game machine, a portable telephone, a smart phone and a controller for floor-standing type game machine, an acceleration sensor or a gyro sensor is mounted so that the function of detecting the attitude of the apparatus is realized. In such an information processing apparatus provided with the attitude sensing function, when the user takes the action of shaking, tilting, rotating, horizontally or vertically moving, or the like of the apparatus, operation on the apparatus is achieved.

An information processing apparatus is provided with an operation part such as buttons, switches, or a touch panel for receiving user's operation. When operation on such an operation part and operation through the above-mentioned attitude sensing function are combined, various kinds of operations are realized. Nevertheless, a possibility is present that at the time when the user performs operation on the operation part, slight inclination or movement occurs in the apparatus. This causes a possibility that when the inclination or the movement generated in association with the operation on the operation part is detected by the attitude sensing function of the information processing apparatus and received as operation, processing not intended by the user is performed by the information processing apparatus.

The example information processing apparatus described herein involves: an operation part; an attitude output part outputting, in time series, attitude data corresponding to attitude; an information storage part storing, in time series, information relevant to the attitude data outputted by said attitude output part; a display processing part, in correspondence to the attitude data outputted by said attitude output part, performing processing concerning display of a three-dimensional virtual space; an information acquiring part, from the information stored in time series by said information storage part, acquiring information corresponding to the time preceding by a given period the time that operation was performed on said operation part; and an information processing part, on the basis of the operation performed on said operation part and the information acquired by said information acquiring part, performing information processing.

These and other purposes, features, aspects, and effects of the technology herein will be further clarified from the following detailed description with reference to the accompanying drawings.

DETAILED DESCRIPTION OF NON-LIMITING EXAMPLE EMBODIMENTS (Embodiment 1)

Figure 1:
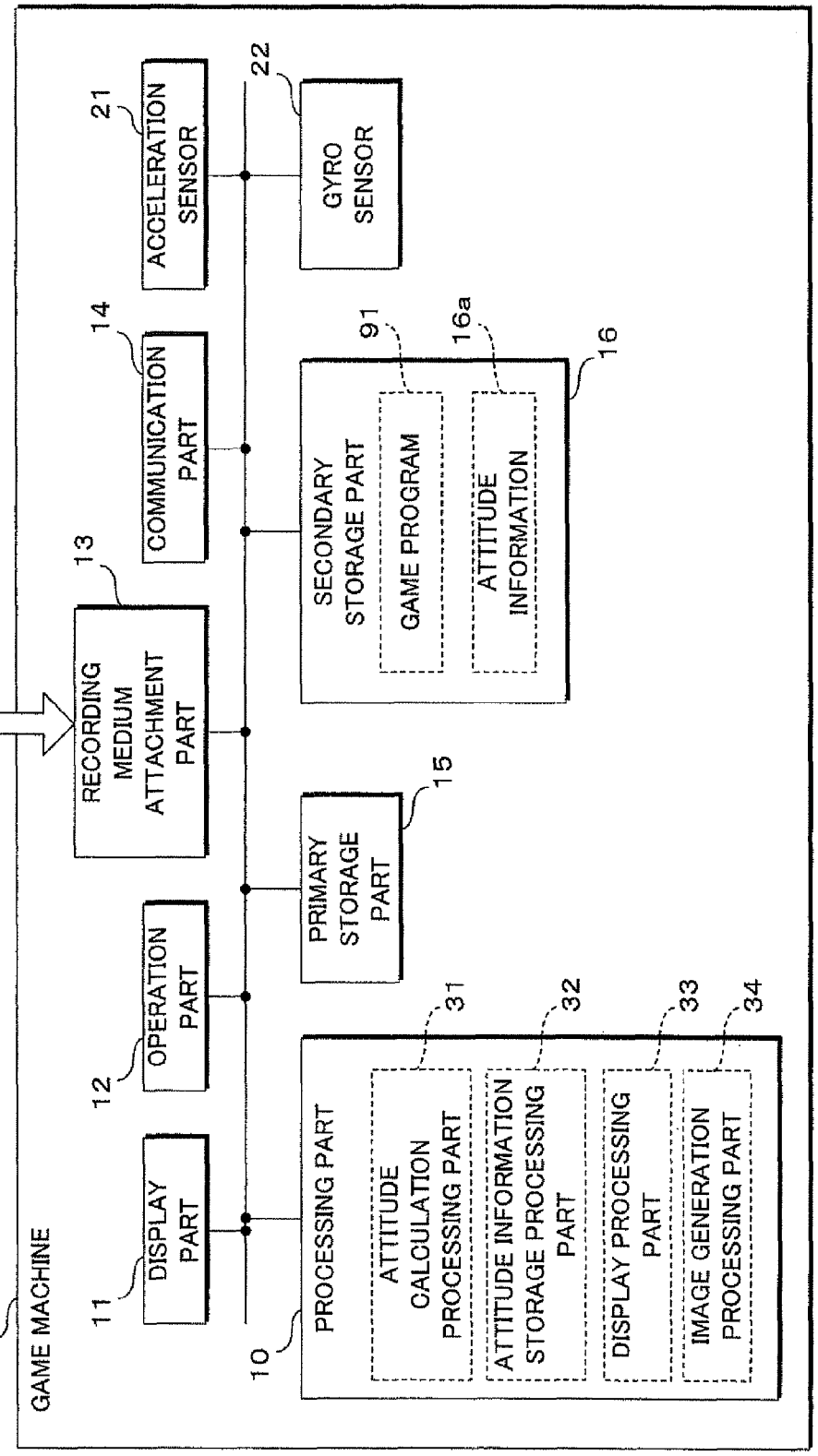
FIG. 1 shows an example no limiting block diagram showing an example configuration of a game machine according to an embodiment.

A recording medium, an information processing apparatus, an information processing system, and an information processing method are described below in detail for example cases of a game program and a game machine with reference to the drawings describing their embodiment. FIG. 1 shows an example no limiting block diagram showing an example configuration of a game machine according to the embodiment. The game machine 1 according to the present embodiment is a portable game machine capable of being carried by a user. Then, a display part 11, an operation part 12, a recording medium attachment part 13, and the like are provided in one housing (not shown). Further, the housing of the game machine 1 contains a processing part 10, a communication part 14, a primary storage part 15, a secondary storage part 16, an acceleration sensor 21, a gyro sensor 22, and the like.

The processing part 10 of the game machine 1 is constructed from an arithmetic processing unit such as a CPU (Central Processing Unit) and an MPU (Micro Processing Unit). The processing part 10 reads into the primary storage part 15 a game program 91 stored in the secondary storage part 16 or a game program 91 recorded on a recording medium 9 attached to the recording medium attachment part 13, and then executes the program so as to perform various kinds of information processing concerning the game. For example, the processing part 10 performs: the processing of receiving operation performed on the operation part 12; the processing of performing determination and the like of the game in correspondence to the received operation; and the processing of, in response to the received operation or an event and the like in the game, generating a game image to be displayed on the display part 11.

The display part 11 is constructed from a liquid crystal panel or a PDP (Plasma Display Panel), and displays an image provided from the processing part 10. The operation part 12 is constructed from, for example, push buttons or a touch panel provided in the display part 11, and notifies the processing part 10 of the contents of the operation performed by the user (for example, push-down or release of a button, and the like). The recording medium attachment part 13 is constructed such that the recording medium 9 of card type, cassette type, or disk type is allowed to be attached and detached. The processing part 10 is allowed to read the game program 91 and other data from the recording medium 9 attached to the recording medium attachment part 13.

The communication part 14 exchanges data with a server apparatus, other game machines 1, or the like via a network such as a portable telephone network and a wireless LAN (Local Area Network). For example, the game machine 1 performs communication with the server apparatus through the communication part 14 so as to download the game program 91 and store the program into the secondary storage part 16. The primary storage part 15 is constructed from a semiconductor memory device and the like. The primary storage part 15 temporarily stores various kinds of data generated in association with the arithmetic processing of the processing part 10. The secondary storage part 16 is constructed from a nonvolatile storage having a larger capacity than the primary storage part 15. The secondary storage part 16 stores the game program 91, other data, and the like. Further, as described later in detail, in the game machine 1 according to the present embodiment, the secondary storage part 16 stores attitude information 16*a*.

The acceleration sensor 21 is a semiconductor acceleration sensor of electrostatic capacitance type, piezoresistance type, or the like, and detects accelerations in three axial directions of X-axis, Y-axis, and Z-axis. Here, the acceleration sensor 21 may be composed of a single sensor detecting accelerations in three axial directions, or alternatively may be constructed from a plurality of acceleration sensors each performing detection in two axes or one axis so that accelerations in three axial directions may be detected. The acceleration sensor 21 outputs the detected accelerations (attitude data) to the processing part 10.

On the basis of the detection result of the acceleration sensor 21, the processing part 10 performs the processing of calculating the attitude of the game machine 1. For example, when the game machine 1 is in a stand-still state, the acceleration sensor 21 detects an acceleration due to gravity. Thus, the processing part 10 is allowed to calculate from the detection result of the acceleration sensor 21 how much the game machine 1 is inclined with respect to the vertical direction. For example, when the game machine 1 is in a moving state, the acceleration sensor 21 detects accelerations corresponding to the movement. Thus, the processing part 10 is allowed to calculate the moving speed, the moving direction, the position, and the like of the game machine 1.

The gyro sensor 22 is composed of, for example, an angular velocity sensor of oscillation type, rotary type, or the like, and detects angular velocities, for example, about the three axes consisting of X-axis, Y-axis, and Z-axis. Here, the gyro sensor 22 may be composed of a single sensor detecting angular velocities about three axes, or alternatively may be constructed from a plurality of gyro sensors each performing detection about two axes or one axis so that angular velocities about three axes may be detected. The gyro sensor 22 outputs the detected angular velocities (attitude data) to the processing part 10. On the basis of the detection result of the gyro sensor 22, the processing part 10 performs the processing of calculating the attitude of the game machine 1. For example, the processing part 10 calculates the time integrals of the angular velocities detected by the gyro sensor 22 (that is, rotation angles), and thereby calculates the inclination, the position, and the like of the game machine 1.

Further, the processing part 10 performs calculation of the attitude on the basis of the above-mentioned detection result of the acceleration sensors 21 and calculation of the attitude on the basis of the detection result of the gyro sensor 22, and then calculates the final attitude of the game machine 1 from the two calculation results. For example, the processing part 10 adopts as the reference attitude the gravity direction calculated on the basis of the detection result of the acceleration sensor 21 at the time that the game machine 1 is in a stand-still state (or in a merely slightly moving state). Then, the processing part 10 concludes the position obtained by rotation of the reference attitude by the rotation angle calculated from the detection result of the gyro sensor 22, as the present position or inclination of the game machine 1. However, the calculation method for the final attitude of the game machine 1 performed by the processing part 10 is not limited to this. That is, other methods of various kinds may be employed.

In the description of the present embodiment, the attitude indicates the inclination, the position, the orientation, and the like of the game machine 1 that is allowed to be obtained by the processing part 10 on the basis of the detection results of the acceleration sensor 21 and the gyro sensor 22. Further, in the game machine 1, the calculation of the attitude on the basis of the detection results of the acceleration sensor 21 and the gyro sensor 22 is performed by the attitude calculation processing part 31 of the processing part 10. The attitude calculation processing part 31 is a software functional block implemented by execution of the game program 91 by the processing part 10.

Further, in the game machine 1, when the game program 91 according to the present embodiment is executed, the attitude information storage processing part 32, the display processing part 33, the image generation processing part 34, and the like are implemented as software functional blocks in addition to the attitude calculation processing part 31. However, a part or all of the attitude calculation processing part 31 to the image generation processing part 34 and the like may be implemented as hardware blocks.

The attitude calculation processing part 31 of the processing part 10 periodically acquires the detection results of the acceleration sensor 21 and the gyro sensor 22 and then periodically calculates the attitude of the game machine 1. Here, the attitude data calculated by the attitude calculation processing part 31 is be expressed by one or plural numerical values. The attitude information storage processing part 32 of the processing part 10 calculates the average among the present (newest) attitude and the attitude of past several times selected from the attitude periodically calculated by the attitude calculation processing part 31, and then stores in time series as attitude information 16*a* the calculated average into the secondary storage part 16. The secondary storage part 16 stores the newest attitude information 16*a* and the attitude information 16*a* of the past within a given period. Then, when necessary, the attitude information storage processing part 32 reads the attitude information 16*a* of required timing. Here, the attitude information storage processing part 32 may store the attitude information 16*a* into the primary storage part 15.

The display processing part 33 of the processing part 10 performs the processing of displaying a three-dimensional virtual space on the display part 11. In the secondary storage part 16 or the recording medium 9, polygon data, texture data, and the like used for constructing the three-dimensional virtual space is stored in addition to the game program 91. Then, the display processing part 33 reads these data pieces and then construct the three-dimensional virtual space in the primary storage part 15. Further, on the basis of the newest attitude information 16*a* calculated by the attitude information storage processing part 32, that is, on the basis of the attitude of the game machine 1, the display processing part 33 determines the viewpoint, the sight line direction, and the like in the three-dimensional virtual space, and then displays on the display part 11 an image corresponding to the determined viewpoint, direction, and the like.

When given operation has been performed on the operation part 12, the image generation processing part 34 of the processing part 10 generates a two-dimensional image from the above-mentioned three-dimensional virtual space data, and then stores the generated two-dimensional image into the secondary storage part 16.

Figure 2:
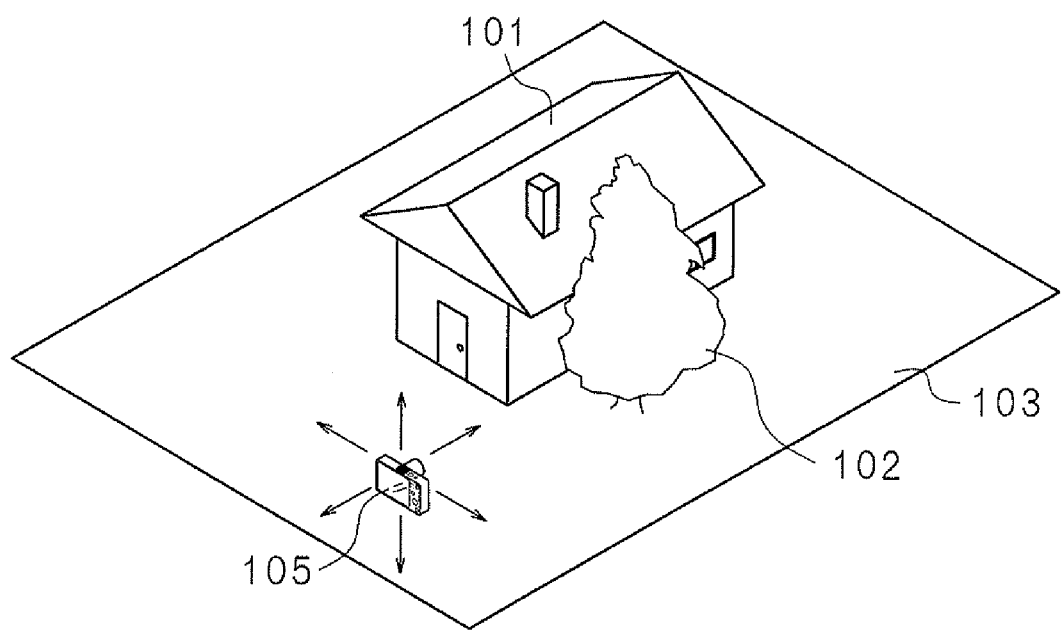
FIG. 2 shows an example no limiting schematic diagram showing an example of a three-dimensional virtual space generated by a game machine.

FIG. 2 shows an example no limiting schematic diagram showing an example of the three-dimensional virtual space generated by the game machine 1. In the three-dimensional virtual space shown in the figure, for example, a building object 101 and a tree object 102 are arranged on a field 103. Then, a virtual camera 105 is arranged in a manner that of facing the two objects. The virtual camera 105 is an object allowed to be operated by the user. By changing the attitude of the game machine 1, the user is allowed to move the virtual camera 105 on the three-dimensional virtual space.

Figure 3:
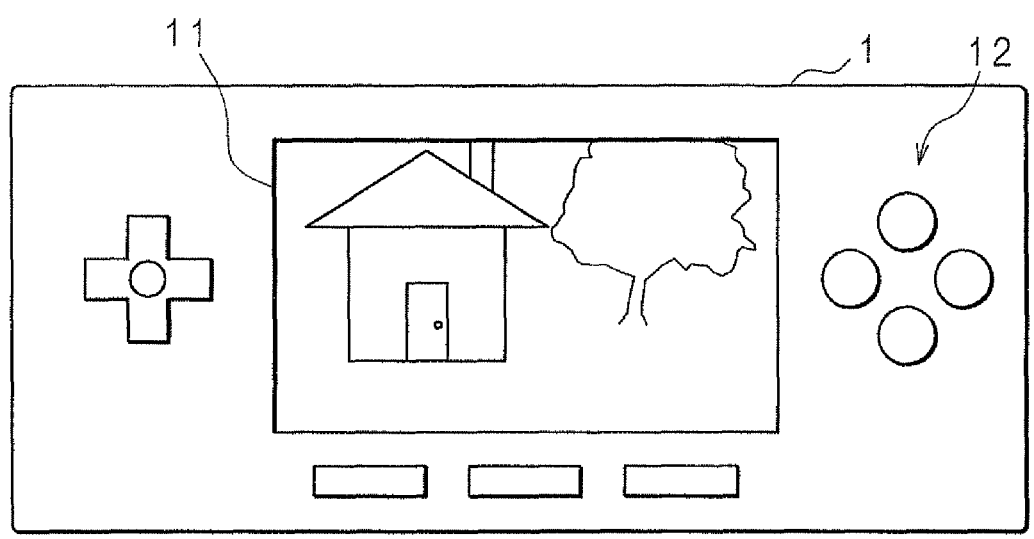
FIG. 3 shows an example no limiting schematic diagram showing a display example of a three-dimensional virtual space generated by a game machine.

FIG. 3 shows an example no limiting schematic diagram showing a display example of the three-dimensional virtual space generated by the game machine 1. This corresponds to the three-dimensional virtual space shown in FIG. 2. On the basis of the attitude of the game machine 1, the display processing part 33 of the game machine 1 determines the position, the orientation, and the like (the viewpoint, the sight line direction, and the like) of the virtual camera 105 in the three-dimensional virtual space (here, only any one of the position and the orientation of the virtual camera 105 may be determined).

For example, at the time of game start, the display processing part 33 sets up the virtual camera 105 into given position and orientation, and then adopts these position and orientation as the reference attitude of the virtual camera 105. Further, the display processing part 33 adopts the attitude of the game machine 1 at this time point as the reference attitude, and establishes correspondence to the reference attitude of the virtual camera 105. After that, when the attitude of the game machine 1 has varied, the display processing part 33 calculates the amount of variation in the attitude of the game machine 1 relative to the reference attitude, and then changes the attitude of the virtual camera 105 from the reference attitude in correspondence to the calculated amount of variation so as to determine the position, the orientation, and the like of the virtual camera 105 in the three-dimensional virtual space.

In correspondence to the determined position, orientation, and the like of the virtual camera 105, the display processing part 33 displays as a two-dimensional image onto the display part 11 the situation of the three-dimensional virtual space viewed from the virtual camera 105. Further, the display processing part 33 successively updates the display of the display part 11. Thus, the display of the display part 11 varies in correspondence to a change in the attitude of the game machine 1, an event in the game, and the like.

In a state that the three-dimensional virtual space is displayed on the display part 11, when given operation (for example, push operation on a particular button) is performed on the operation part 12, the game machine 1 according to the present embodiment generates a two-dimensional image corresponding to the position, the orientation, and the like of the virtual camera 105. In the game machine 1, the image generation processing part 34 stores the generated two-dimensional image into the secondary storage part 16. That is, the game machine 1 and the game program 91 according to the present embodiment allows the user to enjoy as a game the act of photographing in the three-dimensional virtual space by using the virtual camera 105. The user is allowed to perform photographing of the three-dimensional virtual space by changing the attitude of the game machine 1 so as to move the virtual camera 105 in the three-dimensional virtual space and then performing given operation on the operation part 12 at a desired angle. The user is allowed to perform, for example, browsing, list display, image processing, transmission to another game machine 1 through the communication part 14, printing, and the like onto the taken image stored in the secondary storage part 16.

Further, in the game machine 1 according to the present embodiment, the image generation processing part 34 generates the two-dimensional image not in correspondence to the position, the orientation, and the like of the virtual camera 105 corresponding to the attitude of the game machine 1 realized at the time that given operation was performed on the operation part 12, but in correspondence to the position, the orientation, and the like of the virtual camera 105 corresponding to the attitude of the game machine 1 realized at a time point before given operation was performed. Thus, the image generation processing part 34 generates the two-dimensional image without the influence of a change in the attitude of the game machine 1 generated when the user has performed given operation on the operation part 12.

As described above, the attitude information storage processing part 32 of the game machine 1 stores in time series into the secondary storage part 16 the attitude information 16a based on the detection results of the acceleration sensor 21 and the gyro sensor 22. In the processing part 10 of the game machine 1, when given operation on the operation part 12 is received, the attitude information storage processing part 32 reads the attitude information 16a having been detected and stored at the time preceding by a given time the time that the operation was received. The image generation processing part 34 generates a two-dimensional image in the three-dimensional virtual space at present (at the time of receiving the operation on the operation part 12) on the basis of the attitude information 16a corresponding to the time preceding by a given time having been read by the attitude information storage processing part 32. That is, the image generation processing part 34 generates a two-dimensional image obtained by arranging the virtual camera 105 having the viewpoint, the sight line direction, and the like corresponding to the attitude information 16a corresponding to the time preceding by a given time, in the three-dimensional virtual space at present, and then stores the generated image into the secondary storage part 16.

Figure 4:
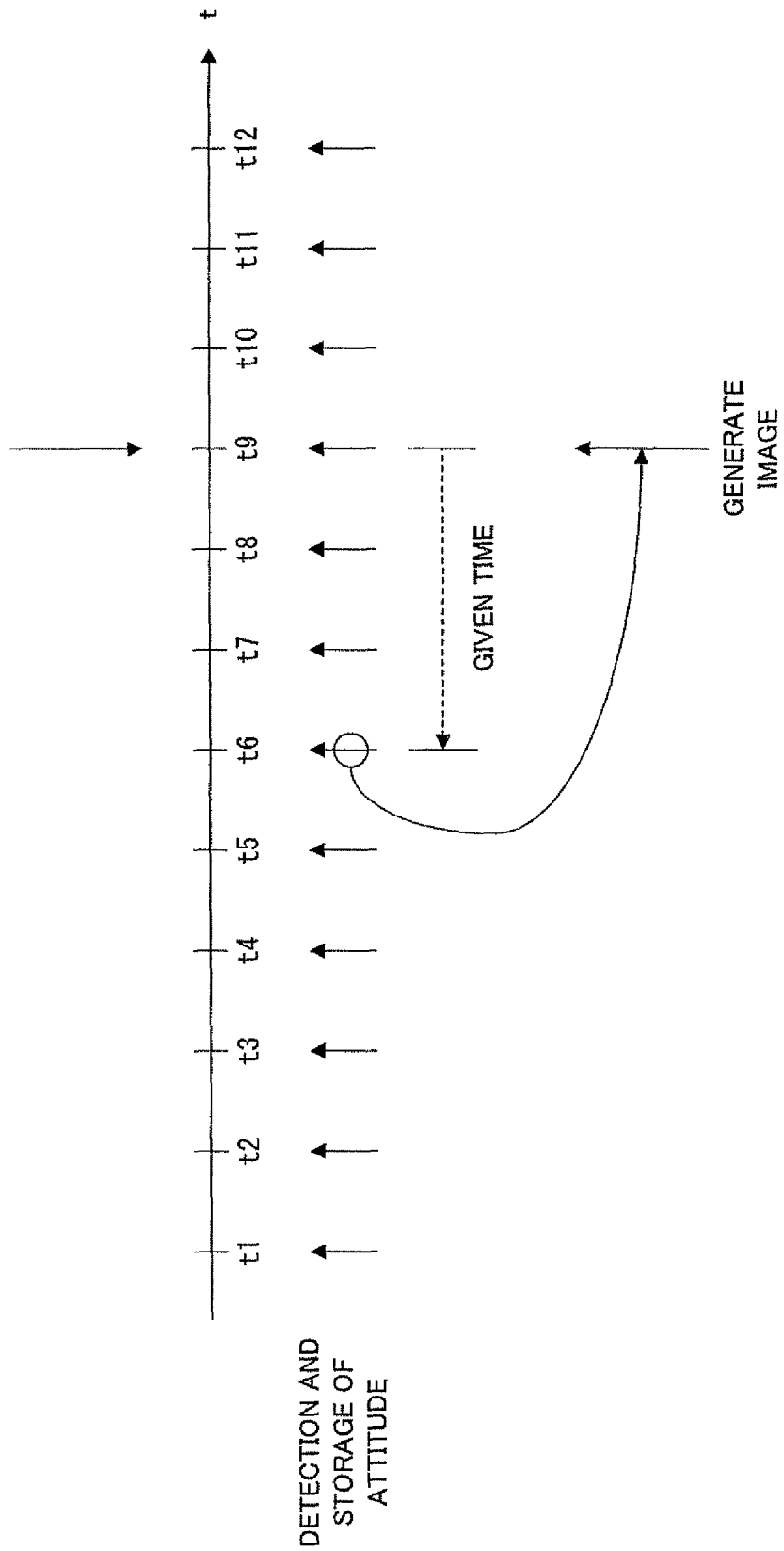
FIG. 4 shows an example no limiting timing chart describing an example of image generation processing performed by a game machine according to Embodiment 1.

FIG. 4 shows an example no limiting timing chart describing an example of image generation processing performed by the game machine 1 according to Embodiment 1. The game machine 1 successively (periodically) performs: detection performed by the acceleration sensor 21 and the gyro sensor 22; attitude calculation performed on the basis of these detection results by the attitude calculation processing part 31; and storage of the attitude information 16a performed in correspondence to the calculation result by the attitude information storage processing part 32 (see timings t1 to t12 in FIG. 4). Here, for example, when given operation on the operation part 12 has been performed at timing t9, the attitude information storage processing part 32 reads from the secondary storage part 16 the attitude information 16a corresponding to the timing (t6) corresponding to the time preceding by a given time (the time corresponding to three cycles in the example in FIG. 4). Then, on the basis of the attitude information 16a corresponding to the time preceding by a given time having been read by the attitude information storage processing part 32, the image generation processing part 34 generates a two-dimensional image from the three-dimensional virtual space data at present (timing of t9).

Figure 5:
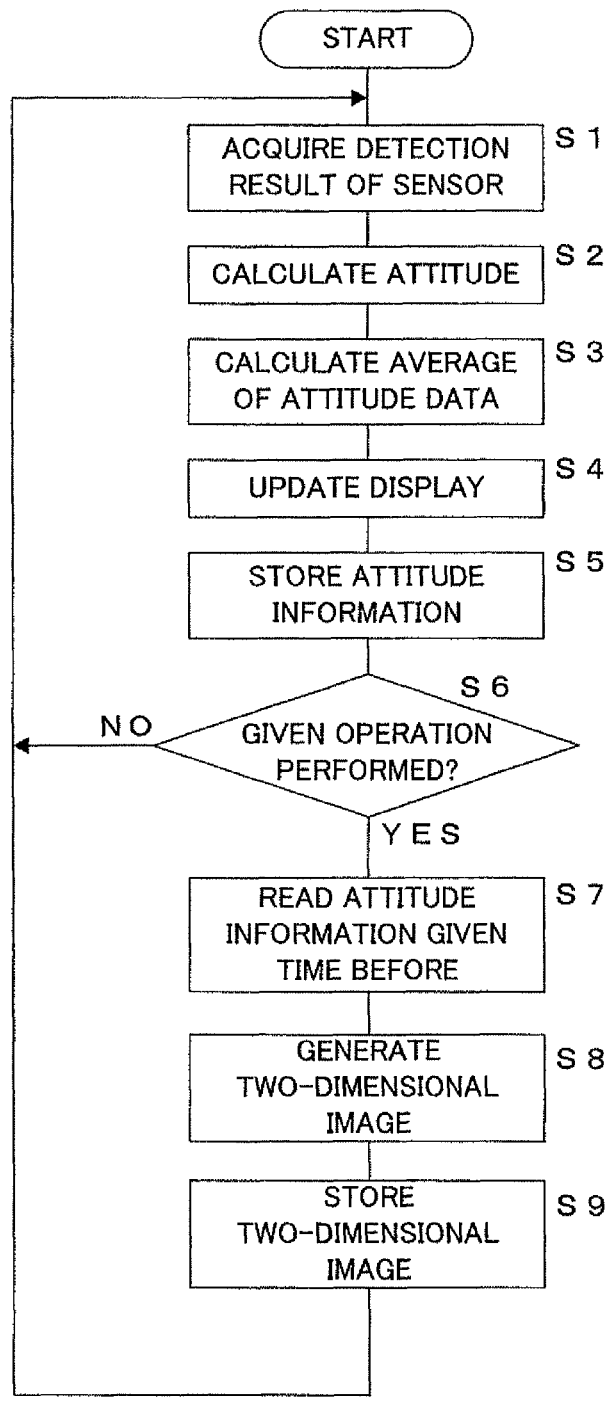
FIG. 5 shows an example no limiting flow chart showing an example procedure of image generation processing performed by a game machine according to Embodiment 1.

FIG. 5 shows an example no limiting flow chart showing an example procedure of image generation processing performed by the game machine 1 according to Embodiment 1. The processing part 10 of the game machine 1 first acquires detection results of the acceleration sensor 21 and the gyro sensor 22 (step S1). Then, on the basis of the acquired detection results, the attitude calculation processing part 31 calculates the attitude of the game machine 1 (step S2). Then, the processing part 10 calculates the average among the newest attitude data calculated by the attitude calculation processing part 31 and the attitude data of past several times (step S3). In the processing part 10, in correspondence to the calculated average of the attitude data, the display processing part 33 causes the display part 11 to update the display of the three-dimensional virtual space (step S4), and then stores as the attitude information 16a into the secondary storage part 16 the calculated average of the attitude data (step S5).

Then, the processing part 10 determines whether given operation has been performed on the operation part 12 (step S6). When given operation is not yet performed (S6: NO), the processing returns to step S1. When given operation has been performed (S6: YES), the attitude information storage processing part 32 of the processing part 10 reads from the secondary storage part the attitude information 16a corresponding to the time preceding by a given period the time that given operation was performed (step S7). After that, on the basis of the attitude information 16a having been read at step S7, the image generation processing part 34 of the processing part 10 generates a two-dimensional image in the three-dimensional virtual space corresponding to the time that the given operation was performed on the operation part 12 (step S8). The image generation processing part 34 stores the generated two-dimensional image into the secondary storage part 16 (step S9), and then returns the procedure to step S1. Here, the processing part 10 of the game machine 1 repeats the processing of steps S1 to S9 with a given period.

The game machine 1 according to Embodiment 1 of the above-mentioned configuration calculates the attitude from the detection results of the acceleration sensor 21 and the gyro sensor 22. Further, the game machine 1 stores in time series as the attitude information 16a the calculated average of the attitude data into the secondary storage part 16 and, at the same time, repeatedly performs the processing of display of the three-dimensional virtual space onto the display part 11 in correspondence to the present attitude (the average of the attitude data including the present attitude). When given operation has been performed on the operation part 12, the game machine 1 acquires from the secondary storage part 16 the attitude information 16a corresponding to the time preceding by a given period the time that given operation was performed. Then, on the basis of the attitude information 16a corresponding to the time preceding by a given period, the game machine 1 generates a two-dimensional image from the three-dimensional virtual space realized at the time that given operation was performed. Thus, even in a case that the attitude of the game machine 1 has varied when the user has performed given operation on the operation part 12, the game machine 1 is allowed to generate a two-dimensional image from the three-dimensional virtual space on the basis of the attitude corresponding to the time preceding by a given period (the attitude at a time point before the attitude has varied). Thus, the user is allowed to enjoy photographing in the three-dimensional virtual space without the necessity of considering the attitude of the game machine 1 realized at the time that given operation is performed.

The present embodiment has been described for a game of photographing in a three-dimensional virtual space. However, employable applications are not limited to this. For example, the technology herein may be applied to other games of various kinds like a shooting game in which the attitude of the game machine 1 is changed so that movement is achieved in a three-dimensional virtual space and then an enemy character or the like in the three-dimensional virtual space is shot in response to given operation. Further, the present embodiment has been described for an example that the technology herein is applied to the game machine 1 of portable type. However, employable applications are not limited to this. For example, the technology herein may be applied to a game machine of floor-standing type. In this case, the operation part 12, the acceleration sensor 21, the gyro sensor 22, and the like may be mounted on a controller or the like of the game machine, and then operation on the operation part 12 and detection results of the sensors may be transmitted from the controller to the game machine 1 by cable or by wireless. Further, employable applications are not limited to a game machine, and the technology herein may be applied to various kinds of information processing apparatuses like a portable telephone, a smart phone, a tablet type information terminal, and a remote controller of an electronic equipment.

In the present embodiment, the acceleration sensor 21 and the gyro sensor 22 have been employed for the purpose of detection of the attitude by the game machine 1. However, employable configurations are not limited to this. That is, only any one of the acceleration sensor 21 and the gyro sensor 22 may be employed. Alternatively, other sensors may be employed. Further, in the game machine 1, the attitude has been calculated from the detection results of the acceleration sensor 21 and the gyro sensor 22, and the calculated average among the attitude data and the attitude data of past several times has been stored as the attitude information 16a into the secondary storage part 16. However, employable configurations are not limited to this. For example, in the game machine 1, calculated attitude data for one time, in place of the average, may be stored as the attitude information 16a. Further, for example, in the game machine 1, the detection results of the acceleration sensor 21 and the gyro sensor 22 (that is, the output values of the sensors) may be stored as the attitude information 16a. Furthermore, for example, in the game machine 1, information such as the moving speed and the moving direction of the game machine 1 obtained by calculation based on the detection results of the acceleration sensor 21 and the gyro sensor 22, that is, interim information for calculating the attitude of the game machine 1 (or alternatively, the average of this information) may be stored as the attitude information 16a.

(Embodiment 2)

In a game machine 1 according to Embodiment 2, the detection results of the acceleration sensor 21 and the gyro sensor 22 or alternatively the attitude data calculated from the detection results is not stored into the secondary storage part 16. Instead, a two-dimensional image generated from the three-dimensional virtual space in correspondence to the attitude calculated from the detection results of the acceleration sensor 21 and the gyro sensor 22 is stored in time series into the secondary storage part 16.

Figure 6:
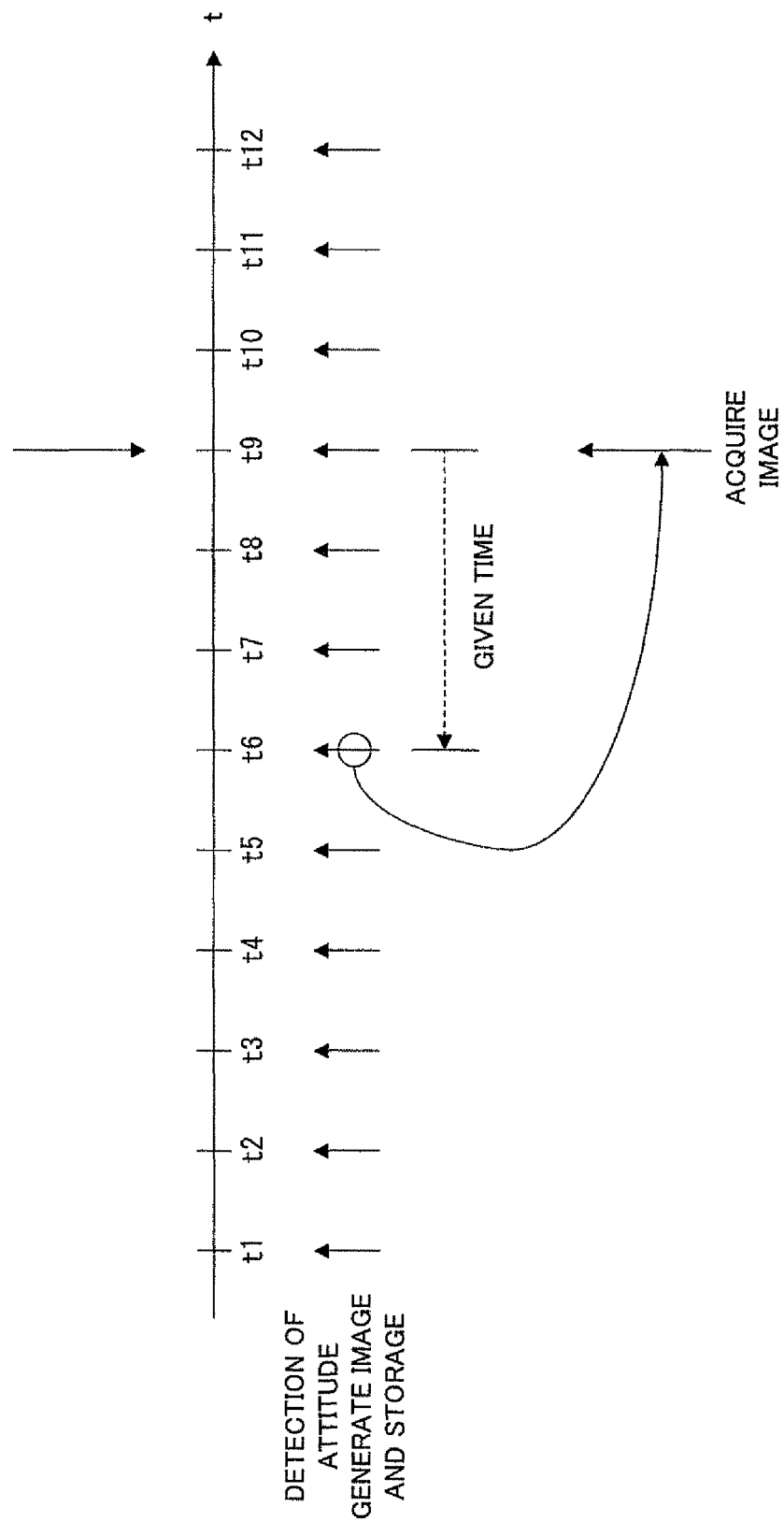
FIG. 6 shows an example no limiting timing chart describing an example of image generation processing performed by a game machine according to Embodiment 2.

FIG. 6 shows an example no limiting timing chart describing an example of image generation processing performed by the game machine 1 according to Embodiment 2. In the game machine 1 according to Embodiment 2, the processing part 10 acquires the detection results of the acceleration sensor 21 and the gyro sensor 22. Then, in correspondence to the acquired detection results, the attitude calculation processing part 31 calculates the attitude of the game machine 1. These processing contents are similar to those of the game machine 1 according to Embodiment 1. In the game machine 1 according to Embodiment 2, on the basis of the attitude calculated by the attitude calculation processing part 31 (or alternatively, on the basis of the average of the attitude for plural times), the image generation processing part 34 generates a two-dimensional image from the three-dimensional virtual space. Then, the attitude information storage processing part 32 stores the generated two-dimensional image into the secondary storage part 16. The game machine 1 periodically repeats these processing steps (see timings t1 to t12 in FIG. 6).

In the game machine 1 according to Embodiment 2, when given operation has been performed on the operation part 12 (t9), a two-dimensional image corresponding to the timing corresponding to the time (t6) preceding by a given period the time that the given operation was performed is acquired from the secondary storage part 16. Then, the acquired two-dimensional image is adopted as an image of the three-dimensional virtual space taken by the user. Thus, even in a case that the attitude of the game machine 1 has varied when the user has performed given operation on the operation part 12, the game machine 1 according to Embodiment 2 is allowed to obtain a two-dimensional image corresponding to the time preceding by a given period (the time before the change in the attitude).

Figure 7:
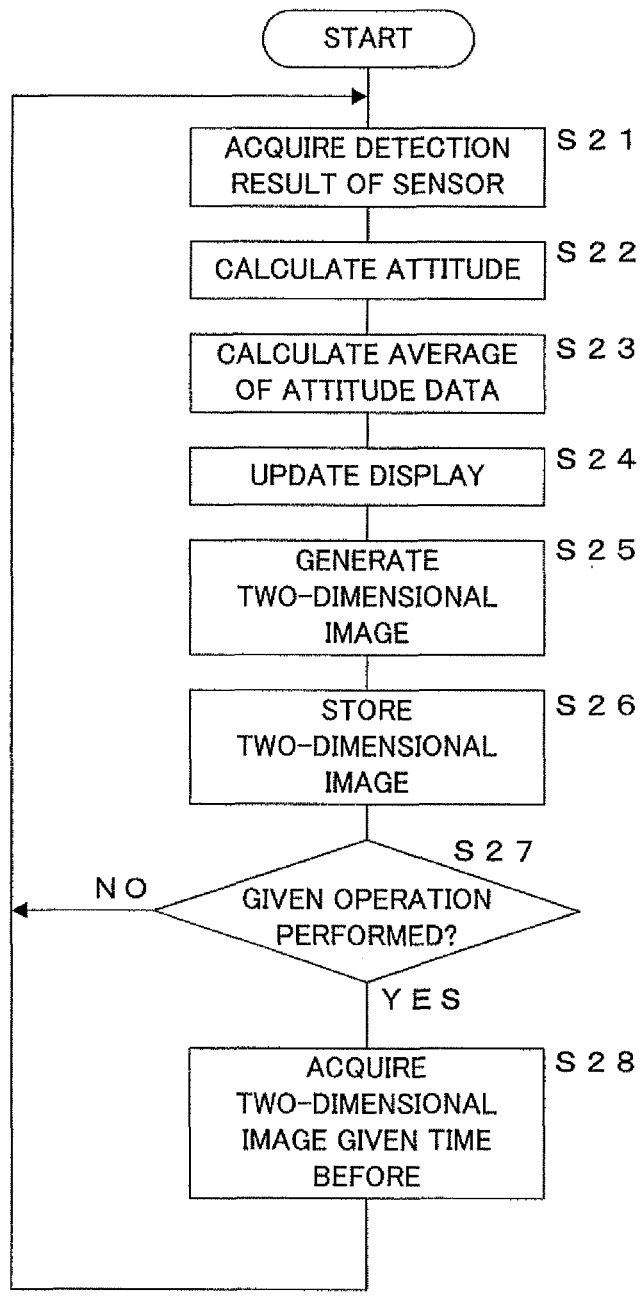
FIG. 7 shows an example no limiting flow chart showing an example procedure of image generation processing performed by a game machine according to Embodiment 2.

FIG. 7 shows an example no limiting flow chart showing an example procedure of image generation processing performed by the game machine 1 according to Embodiment 2. The processing part 10 of the game machine 1 first acquires detection results of the acceleration sensor 21 and the gyro sensor 22 (step S21). Then, on the basis of the acquired detection results, the attitude calculation processing part 31 calculates the attitude of the game machine 1 (step S22). Then, the processing part 10 calculates the average among the newest attitude data calculated by the attitude calculation processing part 31 and the attitude of past several times (step S23). Then, in the processing part 10, in correspondence to the calculated average of the attitude, the display processing part 33 causes the display part 11 to update the display of the three-dimensional virtual space (step S24). Then, on the basis of the calculated average of the attitude data, the processing part 10 generates a two-dimensional image in the three-dimensional image (step S25), and then stores the generated two-dimensional image into the secondary storage part 16 (step S26).

Then, the processing part 10 determines whether given operation has been performed on the operation part 12 (step S27). When given operation is not yet performed (S27: NO), the processing returns to step S21. When given operation has been performed (S27: YES), the attitude information storage processing part 32 of the processing part 10 acquires from the secondary storage part a two-dimensional image corresponding to the time preceding by a given period the time that given operation was performed (step S28), and then adopts this two-dimensional image as an image taken by the user. Here, the processing part 10 of the game machine 1 repeats the processing of steps S21 to S28 with a given period.

In the game machine 1 having the above-mentioned configuration according to Embodiment 2, a two-dimensional image based on the attitude corresponding to the detection results of the acceleration sensor 21 and the gyro sensor 22 is generated and stored in time series into the secondary storage part 16. Then, when given operation has been performed on the operation part 12, the game machine 1 acquires a two-dimensional image corresponding to the time preceding by a given time the time that the given operation was performed, and then adopts this image as a taken image.

Thus, even in a case that the attitude of the game machine 1 has varied when the user has performed given operation on the operation part 12, the game machine 1 according to Embodiment 2 is allowed to acquire a two-dimensional image corresponding to the time preceding by a given period the time of attitude change and then adopt this image as a taken image. Further, an effect similar to that of the game machine 1 according to Embodiment 1 is obtained in which photographing in the three-dimensional virtual space is enjoyed without the necessity of considering the attitude of the game machine 1 realized at the time that given operation is performed.

The other points in the configuration of the game machine 1 according to Embodiment 2 are similar to those in the configuration of the game machine 1 according to Embodiment 1. Thus, like components are designated by like numerals, and their detailed description is omitted.

(Embodiment 3)

Figure 8:
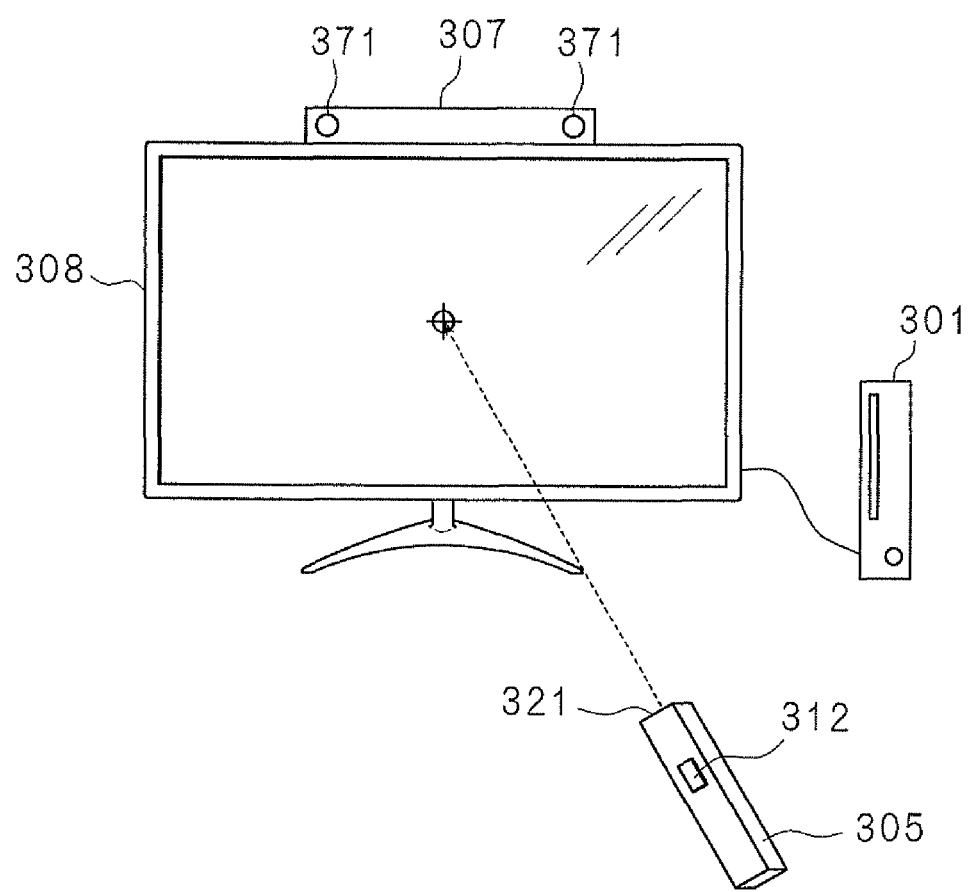
FIG. 8 shows an example no limiting schematic diagram describing an example game machine according to Embodiment 3.

FIG. 8 shows an example no limiting schematic diagram describing an example game machine 301 according to Embodiment 3. The game machine 301 according to Embodiment 3 is a game machine of so-called floor-standing type. The game machine 301 is connected to a display apparatus 308 such as a liquid crystal display, and displays an image concerning the game (for example, an image of the three-dimensional virtual space) onto the display apparatus 308. In the game machine 301, a controller 305 is associated for the purpose of allowing the user to perform operation concerning the game. The game machine 301 and the controller 305 exchange data with each other by wireless.

The controller 305 is provided with a housing, for example, of rectangular bar shape that allows the user to grasp it. The user grasps the controller 305 and then changes the attitude of the controller 305 like movement and rotation, so as to perform operation in the game. Further, one side surface of the controller 305 is provided with an operation part 312 where one or plural buttons and the like are arranged. The user is allowed to perform operation in the game by performing push operation or the like on the buttons of the operation part 312. In the example shown in the figure, in the game machine 301, the user is allowed to enjoy a shooting game in which one point in the game image displayed on the display apparatus 308 is specified as a fiducial (target) by changing the attitude of the controller 305 and then shooting or the like is performed at the fiducial position in response to operation on the operation part 312.

The controller 305 of the game machine 301 according to Embodiment 3 receives infrared light so as to detect the fiducial position in correspondence to the attitude of the controller 305. For example, an infrared light emitting apparatus 307 connected to the game machine 301 is placed on the display apparatus 308. The infrared light emitting apparatus 307 is provided with a housing having an approximately rectangular parallelepiped shape elongated in the horizontal direction of the display apparatus 308. At each end in the horizontal direction in the front face of the housing, an infrared light emission part 371 is provided. One end surface of the controller 305 is provided with an infrared light receiving part 321. The infrared light receiving part 321 receives infrared light from the infrared light emission part 371 of the infrared light emitting apparatus 307. For example, in correspondence to the relative positions and the like of the received two infrared light rays, the infrared light receiving part 321 calculates the fiducial position specified by the controller 305.

The controller 305 transmits to the game machine 301 by wireless the light receiving result of the infrared light receiving part 321 (or alternatively, the fiducial position calculated from this light receiving result) and information on the presence or absence or the like of operation on the operation part 312.

Then, in correspondence to the light receiving result of the infrared light receiving part 321, the game machine 301 calculates the fiducial position specified by the controller 305, and then stores in time series into the secondary storage part 16 the calculated fiducial position (Alternatively, the average of fiducial positions for plural times may be stored). Further, the game machine 301 performs the processing of displaying a three-dimensional virtual space onto the display apparatus 308, and hence displays a cursor image indicating the fiducial position and the like corresponding to the attitude of the controller 305, in a manner of being overlaid on the three-dimensional virtual space. When given operation indicating shooting or the like is performed on the operation part 312 of the controller 305, the game machine 301 reads from the secondary storage part 16 the fiducial position corresponding to the time preceding by a given period the time that the given operation was performed. Then, the game machine 301 performs judgment of success or failure of the shooting or the like at the fiducial position corresponding to the time preceding by a given time in the three-dimensional virtual space at present.

Accordingly, in the game machine 301 according to Embodiment 3, even in a case that the fiducial position specified by the controller 305 varies at the time when the user performs given operation on the operation part 312, information processing is performed in correspondence to the fiducial position corresponding to the time preceding by a given time the time of attitude change. Thus, the user is allowed to enjoy the game such as shooting in a three-dimensional virtual space, without the necessity of considering the attitude of the controller 305 at the time of given operation.

In the game machine 301 having the above-mentioned configuration according to Embodiment 3, infrared light emitted from the infrared light emission part 371 of the infrared light emitting apparatus 307 installed in the outside of the controller 305 like in the display apparatus 308 is received by the infrared light receiving part 321 of the controller 305. In correspondence to the light receiving result, the game machine 301 calculates the fiducial position corresponding to the attitude of the controller 305. Thus, even in a case of the controller 305 not provided with the acceleration sensor 21 and the gyro sensor 22, the game machine 1 is allowed to perform information processing on the basis of the fiducial position corresponding to the attitude of the controller 305. Further, the controller 305 may further include the acceleration sensor 21 or the gyro sensor 22 and the like, and may calculate the attitude on the basis of the light receiving result of the infrared light receiving part 321 and the detection result of the sensor.

Embodiment 3 has been described for a configuration that the game machine 301 performs information processing concerning a shooting game in which a user specifies a fiducial position in correspondence to the attitude of the controller 305 and then performs shooting in correspondence to given operation onto the operation part 312. However, employable applications are not limited to this. For example, similarly to the game machine 1 according to Embodiments 1 and 2, the game machine 301 may perform a game of photographing in a three-dimensional virtual space. In this case, similarly to the game machine 1 according to Embodiment 2, the game machine 301 may have a configuration that a fiducial position (an image acquisition position) calculated from the light receiving result of the infrared light receiving part 321 is not stored into the secondary storage part 16 and that, instead, a two-dimensional image generated from the three-dimensional virtual space data on the basis of the calculated fiducial position is stored.

The other points in the configuration of the game machine 301 according to Embodiment 3 are similar to those in the configuration of the game machine 1 according to Embodiment 1. Thus, like components are designated by like numerals, and their detailed description is omitted.

According to an aspect, even when the attitude is changed by operation performed on the operation part, the attitude sensing function avoids a situation that processing not intended by the user is performed. Thus, various kinds of operation are realized by combining the operation using the operation part and the operation using the attitude sensing function. This improves the operability, the convenience, and the like of the apparatus.

In the present specification, each element described in a singular form and provided with an article "a" or "an" at the head should be recognized as not eliminating a plurality of elements related with this.

What is claimed is:

1. A non-transitory recording medium storing an information processing program causing
an information processing apparatus, provided with an operation part and with an attitude detector outputting, in time series, attitude data corresponding to attitude, to:
    store information relevant to the attitude data outputted by said attitude detector into a storage;
    perform processing concerning display of a three-dimensional virtual space, in correspondence to the attitude data outputted by said attitude detector;
    detect an operation performed on said operation part an operation time;
    acquire information from the storage corresponding to information stored at a given time, which precedes the operation time; and
    perform information processing based on the detected operation and the acquired information corresponding to the given time, which precedes the operation time, but not based on information from the storage corresponding to the operation time.

2. The recording medium according to claim 1, causing said information processing apparatus to further:
    calculate said attitude in time series in correspondence to the attitude data outputted by said attitude detector; and
    store the calculated attitude into the storage.

3. The recording medium according to claim 2, wherein the performed information processing is concerning the three-dimensional virtual space at the time when said given operation was performed.

4. The recording medium according to claim 2, causing said information processing apparatus to further:
    calculate an average of the plural pieces of calculated attitude; and
    store the calculated average of the attitude into the storage.

5. The recording medium according to claim 1, wherein when given operation has been performed on said operation part, the performed information processing is generating a two-dimensional image from said three-dimensional virtual space, on the basis of the acquired information corresponding to the given time.

6. The recording medium according to claim 1, causing said information processing apparatus to further:
generate a two-dimensional image from said three-dimensional virtual space in time series, in correspondence to the attitude data outputted by said attitude detector; and
store the generated two-dimensional image into the storage in time series.

7. The recording medium according to claim 6, wherein, when given operation has been performed on said operation part, the acquired information is a two-dimensional image corresponding to the given time, and
the performed information processing is based on the acquired two-dimensional image at the given time.

8. A non-transitory recording medium storing an information processing program causing
an information processing apparatus provided with an operation part and with an attitude output part outputting, in time series, attitude data corresponding to attitude, to operate as:
an attitude calculating part, in correspondence to the attitude data outputted by said attitude output part, calculating said attitude;
an average calculating part calculating an average of the plural pieces of attitude calculated in time series by said attitude calculating part;
a generating part, in correspondence to the average of the attitude calculated by said average calculating part, generating a two-dimensional image from said three-dimensional virtual space;
an information storage part storing, in time series, the two-dimensional image generate by said generating part;
a display processing part, in correspondence to the attitude data outputted by said attitude output part, performing processing concerning display of a three-dimensional virtual space;
an information acquiring part, from the information stored in time series by said information storage part, acquiring information corresponding to the time preceding by a given period the time that given operation was performed on said operation part; and
an information processing part, on the basis of the operation performed on said operation part and the information acquired by said information acquiring part, performing information processing.

9. An information processing apparatus comprising:
an operation part;
an attitude detector outputting, in time series, attitude data corresponding to attitude; and
at least one processor that is coupled to the operation part and the attitude detector, the at least one processor configured to:
store information relevant to the attitude data outputted by said attitude detector into a storage;
perform processing concerning display of a three-dimensional virtual space, in correspondence to the attitude data outputted by said attitude detector;
detect an operation performed on said operation part at an operation time;
acquire information from the storage, corresponding to information stored at a given time, which precedes the operation time; and
perform information processing based on the detected operation and the acquired information corresponding to the given time, which precedes the operation time, but not based on information from the storage corresponding to the operation time.

10. The information processing apparatus according to claim 9, wherein said attitude detector outputs an angular velocity measured by a gyro sensor.

11. The information processing apparatus according to claim 9, wherein said attitude detector outputs an acceleration measured by an acceleration sensor.

12. The information processing apparatus according to claim 9, wherein said operation part and said attitude detector are provided in one housing.

13. The information processing apparatus according to claim 12, further comprising a display provided in said housing, wherein the processor is further configured to
display a three-dimensional virtual space on said display.

14. An information processing system provided with a processor, a storage, an operation part and an attitude detector outputting attitude data corresponding to attitude in time series, the processor is configured to:
store information relevant to the attitude data outputted by said attitude detector into the storage;
perform processing concerning display of a three-dimensional virtual space, in correspondence to the attitude data output by said attitude detector;
detect an operation performed on said operation part at an operation time;
acquire information corresponding to information stored at a given time, which precedes the operation time; and
perform information processing based on the detected operation and the acquired information corresponding to the given time, which precedes the operation time, but not based on information from the storage corresponding to the operation time.

15. An information processing method of performing information processing by using an information processing apparatus provided with an operation part and with an attitude detector outputting attitude data corresponding to attitude in time series, said method comprising:
storing information relevant to the attitude data outputted by said attitude detector into a storage;
performing processing concerning display of a three-dimensional virtual space, in correspondence to the attitude data outputted by said attitude detector;
detecting an operation performed on said operation part at an operation time;
acquiring information from the storage corresponding to the information stored at a given time, which precedes the operation time; and
performing information processing, on the basis of the detected operation and the acquired information corresponding to the given time, which precedes the operation time, but not based on information from the storage corresponding to the operation time.

16. The recording medium according to claim 1, wherein the performed processing is based on the detected operation and the acquired information corresponding to the given time, which precedes the operation time, but not based on information from the storage corresponding to the operation time, or information stored between the given time and the operation time.

* * * * *